United States Patent [19]
Woollenweber et al.

[11] Patent Number: 6,102,672
[45] Date of Patent: Aug. 15, 2000

[54] MOTOR-DRIVEN CENTRIFUGAL AIR COMPRESSOR WITH INTERNAL COOLING AIRFLOW

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/926,881

[22] Filed: Sep. 10, 1997

[51] Int. Cl.$^7$ ...................................................... F04B 35/04
[52] U.S. Cl. ........................... 417/366; 417/369; 417/370
[58] Field of Search ............................. 417/366, 368–370, 417/423.8

[56] References Cited

U.S. PATENT DOCUMENTS

| | | | |
|---|---|---|---|
| 2,301,063 | 11/1942 | McConaghy | 417/370 |
| 3,341,113 | 9/1967 | Sebok et al. | 417/368 |
| 4,616,980 | 10/1986 | Carpenter | 417/369 |
| 4,684,329 | 8/1987 | Hashimoto | 417/366 |
| 4,699,573 | 10/1987 | Petrie et al. | 417/370 |
| 4,767,285 | 8/1988 | Jyoraku et al. | 417/366 |

*Primary Examiner*—Charles G. Freay
*Attorney, Agent, or Firm*—Brinks Hofer Gilson & Lione

[57] ABSTRACT

A motor-driven compressor comprises a motor that is carried by a motor-enclosing housing portion, a compressor wheel that is driven by the motor within a second housing portion forming a pressurized enclosure, and means for providing a flow of cooling air for the motor from the pressurized compressor housing portion to the motor-enclosing housing portion. In this motor-driven compressor a small portion of the air flowing through the compressor is directed to the motor housing as cooling air for the motor windings and then is either exhausted to atmosphere or recirculated to the compressor air inlet. As a result, a portion of the internal heat generated in the windings is carried away, permitting a higher level of power to be produced reliably by the motor on a continuous basis and, in turn, allowing the compressor to deliver more compressed air at higher pressure to the receiving entity.

25 Claims, 6 Drawing Sheets

MOTOR-DRIVEN CENTRIFUGAL AIR COMPRESSOR WITH INTERNAL COOLING AIRFLOW

FIELD OF THE INVENTION

This invention relates generally to motor-driven air compressors for supplying compressed air in various industrial processes, and particularly to motor-driven compressors for supplying charge air to the cylinders of internal combustion engines.

BACKGROUND OF THE INVENTION

Motor-driven compressors currently in use in commercial internal combustion engines usually consist of a brushless electric motor mounted in a aluminum housing and driving a centrifugal air compressor wheel within an enclosing compressor casing, as indicated in FIG. 1. Such motor-driven compressors are frequently located within the engine compartment of a vehicle where the surrounding environment is at a substantially elevated temperature. In the operation of such air compressors, the motor is energized from an external power source such as a battery, through an electronic controller which changes direct current from the battery to alternating current to produce a rotating magnetic field in the motor windings. The rotating field surrounding motor magnets mounted on the drive shaft generates torque that rotates the compressor wheel and shaft assembly. The compressor wheel induces air from the atmosphere or an air cleaner into the compressor air inlet and delivers it from the compressor casing at above-atmosphere pressure.

In many applications, such as in supercharging systems for internal combustion engines, small size is an advantage and compressor motors may be temperature sensitive. By a temperature sensitive motor, we mean a motor whose reliability may be at risk, or whose performance may be degraded, by the inability to dissipate heat generated during its operation and its resulting internal temperatures, for example, a small electric motor whose internal temperature, due to the heat generated by its winding losses and the inability to adequately dissipate the heat, may endanger the motor insulation.

Internal combustion engine supercharging systems and other applications desirably employ a compact air blower assembly provided by high speed brushless electric motor comprising a stator and a rotor and rotatable shaft carried by a pair of shaft bearings, with the rotatable shaft including a shaft extension extending outwardly from one of the shaft bearings. Such a compact air blower assembly can include a housing with a first portion carrying the electric motor and shaft bearings and a second portion forming a compressor enclosure about the shaft extension with a centrally located air inlet and a peripherally located compressed air outlet. The compressor enclosure encompasses a centrifugal compressor wheel which is formed by a solid back wall extending radially outwardly from a shaft-engaging hub and a plurality of air-moving blades projecting radially and axially outward from the back wall to edge portions that radiate within the compressor enclosure between the air inlet and the air outlet. The high speed brushless electric motor can rotate such a centrifugal blower wheel at high speeds to provide a flow of compressed air at its periphery.

In applications such as internal combustion engine supercharging systems, compromises in the selection and use of electric motors have been required because of hostile motor environments and the relative inefficiencies of small motors. Thus, in such applications the amount of compressed air that can be reliably produced on a continuous basis by current motor-driven compressors is frequently limited by the temperatures generated in the windings of the electric motor. Low-speed motors have employed some type of internal fan attached to the shaft to produce a flow of cooling air through the motor and around its internal components to limit their temperatures; however, with very high-speed brushless motors, the use of small internal fans imposes a significant and undesirable load on the electric motor, becomes rather difficult to implement and complicates the internal construction of the compressor housing assembly.

SUMMARY OF THE INVENTION

This invention provides a motor-driven compressor assembly wherein a small portion of the air flowing through the centrifugal compressor is directed to the motor housing as cooling air for the motor windings and then is either exhausted to atmosphere or recirculated to the compressor air inlet. As a result, a portion of the internal heat generated in the windings is carried away, permitting a higher level of power to be produced reliably by the motor on a continuous basis and, in turn, allowing the compressor to deliver more compressed air at higher pressure to the receiving entity.

A motor-driven compressor of the invention comprises a motor that is carried by a motor-enclosing housing portion, a compressor wheel that is driven by the motor within a second housing portion including a pressurized portion, and means for providing a flow of cooling air for the motor from the pressurized compressor housing portion to the motor-enclosing housing portion. The invention includes various means for providing a flow of cooling air to the motor housing portion. A preferred embodiment of this invention allows cooling air to be taken at the periphery of the compressor wheel by an air scoop that directs a selected amount of air behind the compressor wheel for introduction into the motor housing interior through one or more holes drilled through the housing wall. In another embodiment, a conduit for the flow of cooling air can be provided between the pressurized compressor housing portion and motor-enclosing housing portion. For example, an external conduit can be connected from the pressurized compressor housing portion to the motor-enclosing housing portion, or drilled passages can extend from the pressurized compressor housing portion to the motor-enclosing housing portion to bleed air from the pressurized portion of the compressor housing portion into the motor housing portion. After passing through motor housing and, preferably, the windings and the air gap between the windings and motor magnet, the cooling air can be exhausted from the motor housing through a non-return check valve, or can be recirculated through an external conduit to the air inlet portion of the compressor enclosure.

DETAILED DESCRIPTION OF THE BEST MODE OF THE INVENTION

Figure 1:
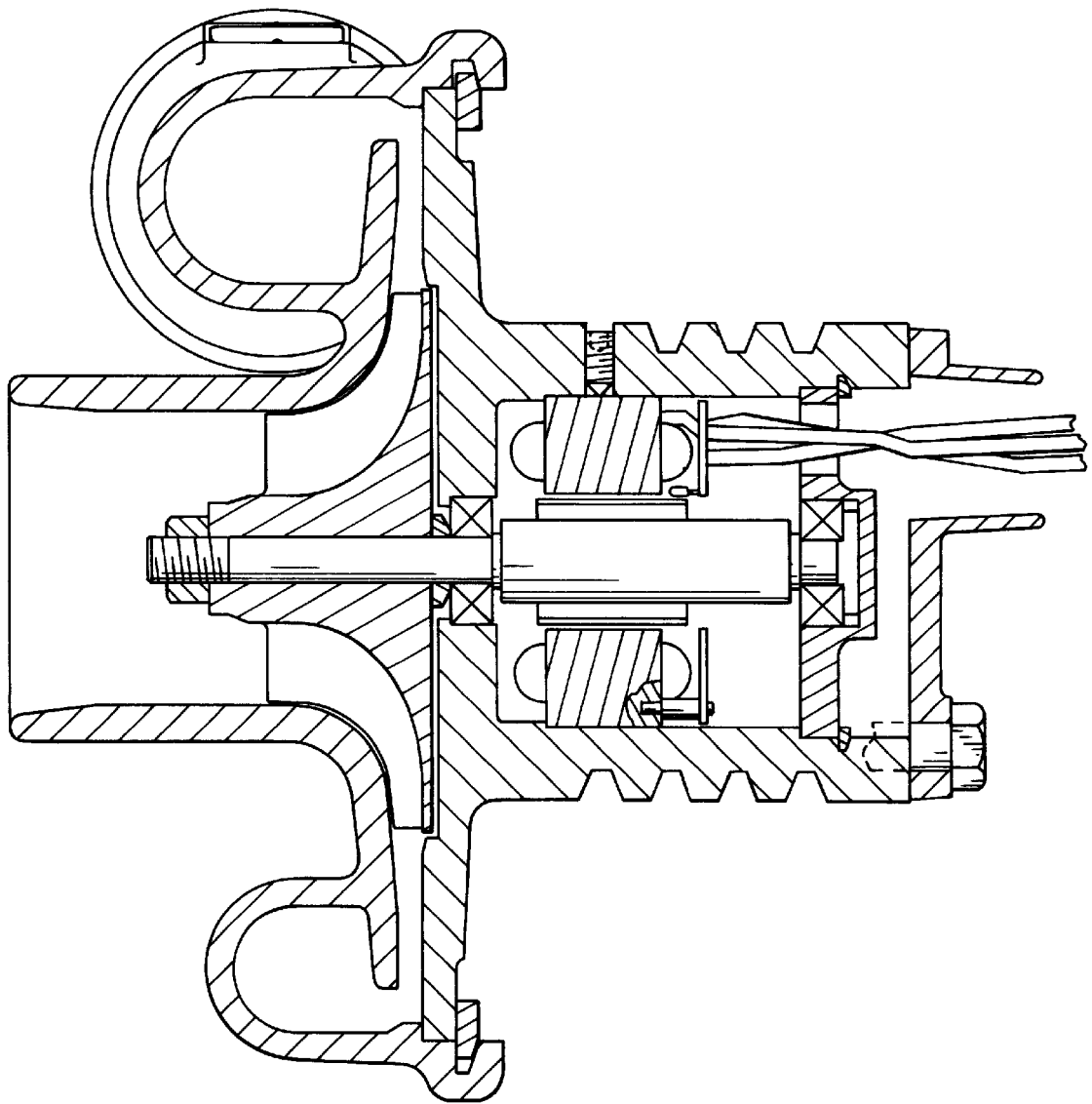
FIG. 1 is a cross-sectional view of a prior art motor-driven centrifugal compressor, taken at a plane through its central axis.

FIG. 1 illustrates a motor-driven compressor of the prior art and FIGS. 2–5 illustrate motor-driven compressors of the invention including various means for providing the motor-enclosing housing portion of the compressor with a flow of compressed air for cooling its internal components.

Figure 2:
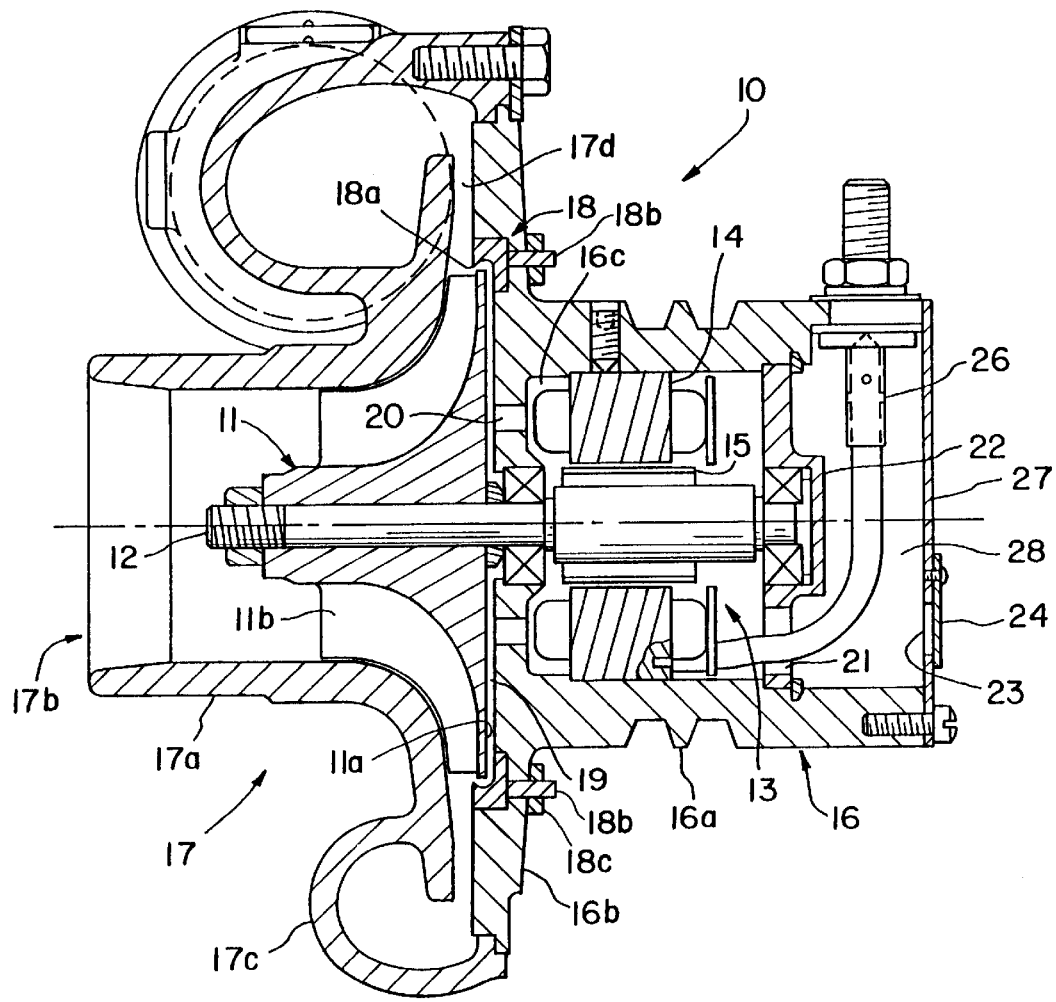
FIG. 2 is a cross-sectional view of a preferred embodiment of a motor-driven centrifugal compressor of this invention, taken at a plane through its central axis, showing the air scoop at the periphery of the compressor wheel.

FIG. 2, for example, illustrates a preferred motor-driven compressor of the invention. As illustrated in FIG. 2, the motor-driven compressor 10 includes a compressor wheel 11 including a back wall 11a and a plurality of radially extending compressor vanes 11b. Compressor wheel 11 is fastened for rotation with a rotating shaft 12 driven by an electric motor 13. The electric motor 13 comprises a plurality of motor windings 14 surrounding permanent magnet assembly 15 fastened to the rotating shaft 12. The motor 13 is preferably a small, high speed, brushless electric motor capable of rotating the shaft 12 at speeds in excess of 4,000 rpm and preferably in the range from 10,000 to 50,000 rpm. The motor 13 is carried within a motor housing 16 which comprises a cylindrical portion 16a carrying the stator windings 14 of the motor 13 within its interior 16c and a planar wall portion 16b extending radially outwardly from the cylindrical portion 16a. The cylindrical motor housing portion 16a carries a support member 22 for one of the shaft bearings at its end opposite the planar wall portion 16b. As illustrated in FIG. 2, the motor 13 is substantially enclosed by the cylindrical motor housing portion 16a and the interior of the planar wall portion 16b which supports the other shaft bearing. The interior 16c of the motor housing 16 is substantially closed at its rear by a back wall 27 except for an opening 23 covered by a non-return check valve 24. A compressor housing 17 is carried at the periphery of the planar wall portion 16b of the motor housing 16. The compressor housing 17 includes an air inlet portion 17a forming a centrally located air inlet 17b to the compressor wheel 11, and a peripheral scroll portion 17c forming a pressurized enclosure 17d for collection and transmission of the flow of compressed air leaving the periphery of the compressor wheel 11.

In the embodiment of FIG. 2, motor-driven compressor 10 includes means for providing a flow of cooling air from the pressurized compressor housing portion 17d to the interior 16c of motor-enclosing housing portion by means of an air scoop 18 that protrudes into the flow of compressed air in the compressor housing portion 17d. As illustrated in FIG. 2, the air scoop comprises an annular lip 18a that projects into the flow of compressed air leaving the periphery of the compression wheel 11 to intercept a small selectable portion of the flow of compressed air from the compressor wheel 11. At the compressor wheel periphery, approximately half of the compression temperature rise has taken place, therefore the collection of cooling air by the overhanging lip 18a at the periphery of the compressor wheel 11 provides cooling air for the motor components at acceptable temperatures. Furthermore, the amount of cooling air can be regulated by the distance the overhanging lip 18a is allowed to protrude into the compressed airflow channel 17d. For example, as shown in FIG. 2, air scoop 18 may be formed by a separate ring element fitted within an annular slot formed in forward wall 16b of the motor housing 16 and held therein by one or more threaded studs 18b that extend therefrom through the forward wall 16b and for engagement by mating nuts 18c, permitting the protrusion of lip 18a into the flow of compressed air to be adjusted by the insertion of shims of differing thicknesses in the annular slot between ring element 18 and forward wall 16b. Cooling air that enters the end cavity 28 can also provide cooling for the winding wire terminal 26.

In the embodiment of FIG. 2 the flow of compressed air intercepted by annular lip 18a is directed into the space 19 between the back wall 11a of the compressor wheel 11 and the front wall 16b of the motor housing 16 and flows through one or more openings 20 formed in the front wall 16b of the motor housing 16 and through the electric motor 15 and is exhausted from the motor housing 16 through an opening 23 formed in the back wall 27 of the motor housing 16 controlled by check valve 24, which may comprise a thin elastomeric diaphragm fastened to the back wall 27 of the motor housing. As indicated by comparison of FIGS. 1 and 2, the motor housing 16 may be like prior art motor housing in substantially every way except in the invention, the forward wall 16b of the motor housing 16 is provided with openings 20 and an air scoop 18 at the periphery of the compressor wheel 11, which may be variably formed for selecting and controlling the amount of cooling air provided through the motor housing interior 16c. As shown in FIG. 2, the openings 20 which direct the flow of cooling air into the motor housing interior 16c are preferably located to direct the flow of cooling air at the motor windings 14.

Figure 3:
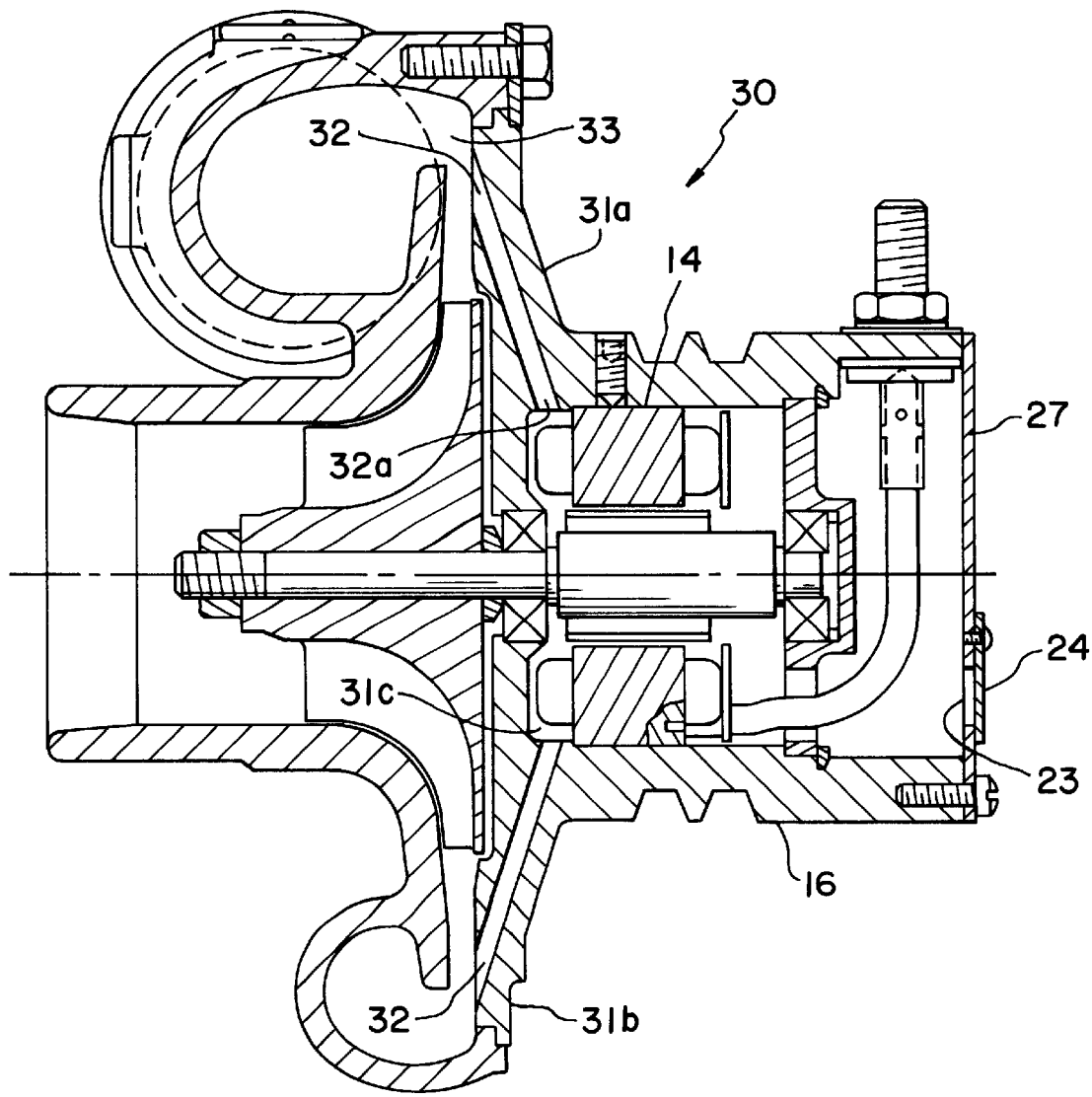
FIG. 3 is a cross-sectional view of another motor-driven centrifugal compressor of this invention, taken at a plane through its central axis, showing an alternative means for providing a flow of cooling air to the motor housing portion.

FIG. 3 illustrates another motor-driven compressor 30 of the invention. In the embodiment of FIG. 3, the means for providing a flow of cooling air to the motor housing comprises at least one conduit, and preferably a plurality of conduits, leading from the pressurized compressor housing portion to the motor-enclosing housing portion. As illustrated in FIG. 3, the motor housing 16 can be provided with a boss or bosses 31a on its planar wall portion 31b and holes 32 can be drilled therethrough to provide an airflow pathway from the pressurized compressor housing portion 33 into the interior 31c of the motor housing 16. As illustrated in FIG. 3, the flow of cooling air from the pressurized portion 33 of the compressor casing is preferably directed by the passageways 32 through openings 32a at the motor windings 14. As in the embodiment of FIG. 2, the cooling air is exhausted to atmosphere through a check valve controlled opening 23, 24 in the rear wall 27 of the motor housing.

Figure 4:
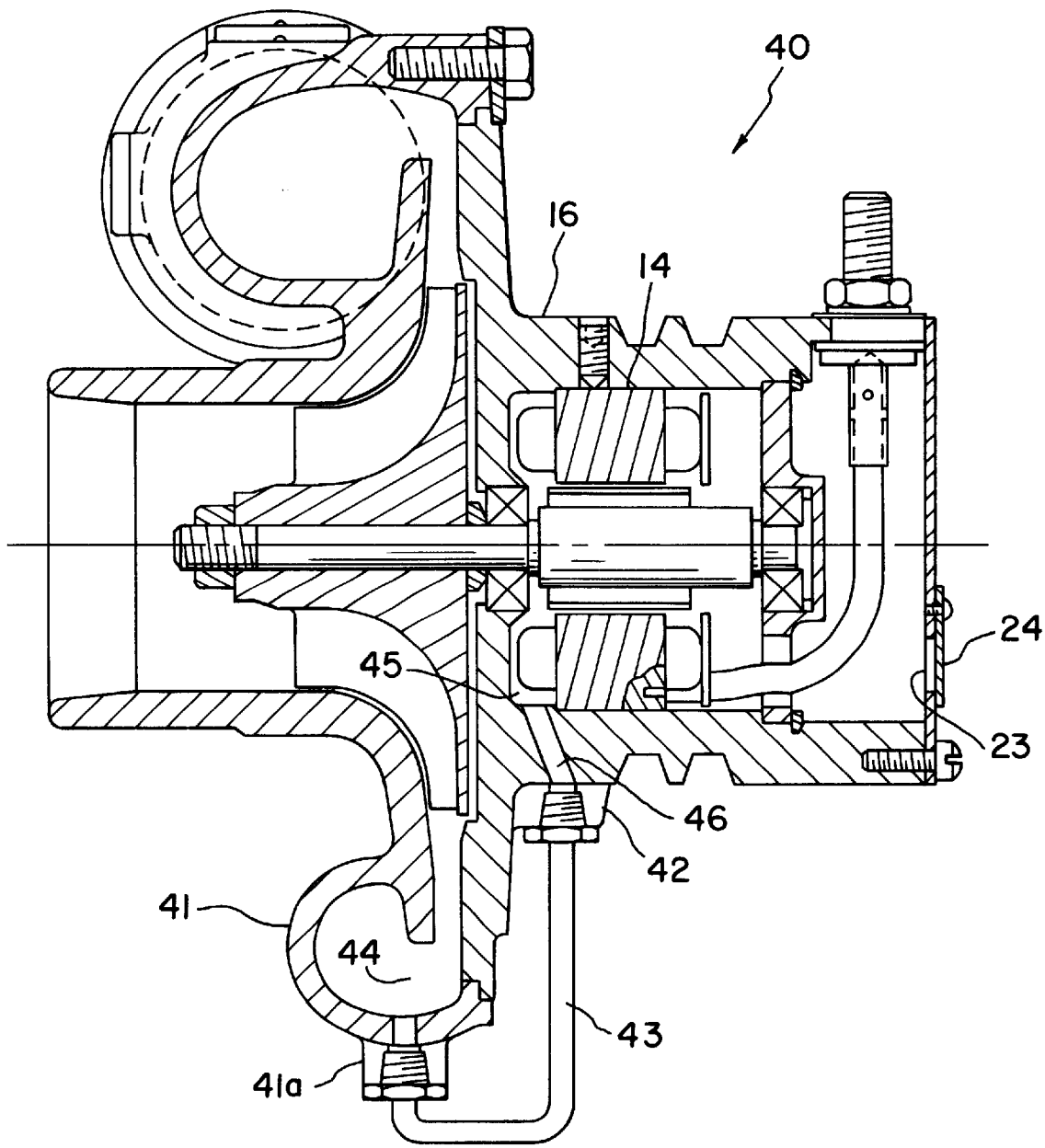
FIG. 4 is a cross-sectional view of a further motor-driven centrifugal compressor of this invention, taken at a plane through its central axis, showing another means for providing a flow of cooling air to the motor housing portion.

FIG. 4 illustrates another motor-driven compressor 40 of the invention which, like the embodiment of FIG. 3, employs an airflow conduit as means for providing a flow of cooling air to the motor housing. As illustrated in FIG. 4, the means for providing cooling air to the motor housing comprises a cooling air conduit formed by pipe 43 extending from the pressurized peripheral portion of the compressor casing 41 and terminating at the periphery of the motor housing 16. As shown in FIG. 4, a boss 41a is provided on compressor casing 41, and a similar boss 42 is provided on motor housing 16. An external conduit or pipe 43 is connected from boss 41a to boss 42 so that cooling air can flow from the pressurized compressor housing portion 44 in the compressor casing 41 through the conduit 43 and enter the motor housing interior 45 through boss 42 and passageway 46. As illustrated in FIG. 4, the passageway 46 directs the flow of cooling air forwardly into the housing portion interior 45 so it may flow rearwardly through the motor windings 14 of the electric motor. The flow of cooling air is exhausted from the motor-driven compressor 40 through a check valve controlled opening 23, 24 as in the embodiment of FIGS. 2 and 3.

Figure 5:
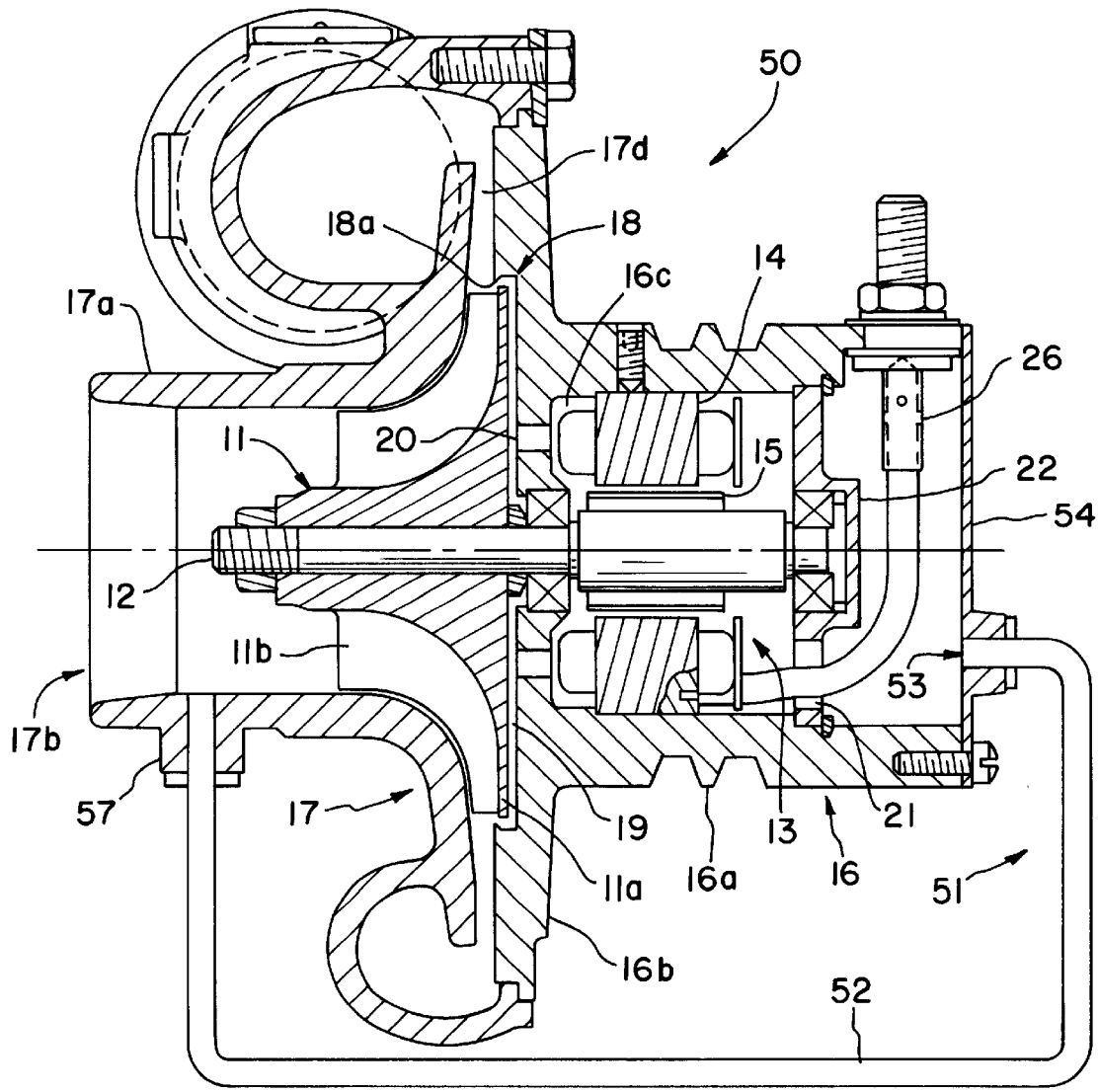
FIG. 5 is a cross-sectional view of a still further motor-driven centrifugal compressor of the invention, taken through its central axis, showing a means for recirculating the flow of cooling air from the motor housing to the compressor inlet.

FIG. 5 illustrates another motor-driven compressor 50 of the invention which is identical to the motor-driven compressor 10 of FIG. 2, except for an additional means 51 for recirculating the flow of cooling air from the motor housing interior 16c to air inlet portion 17a of the compressor. As illustrated in FIG. 5, the means for recirculating the cooling air comprises an external pipe 52 connected at one end with a bossed opening 53 in the rear wall 54 of the motor housing 16 and terminating at its other end in a boss 57 formed at the air inlet portion 17a of the compressor housing 17. The embodiment of FIG. 5 is preferred in the sense that it avoids the loss of any energy remaining in the flow of cooling air after it has passed through the motor housing 16.

Figure 6:
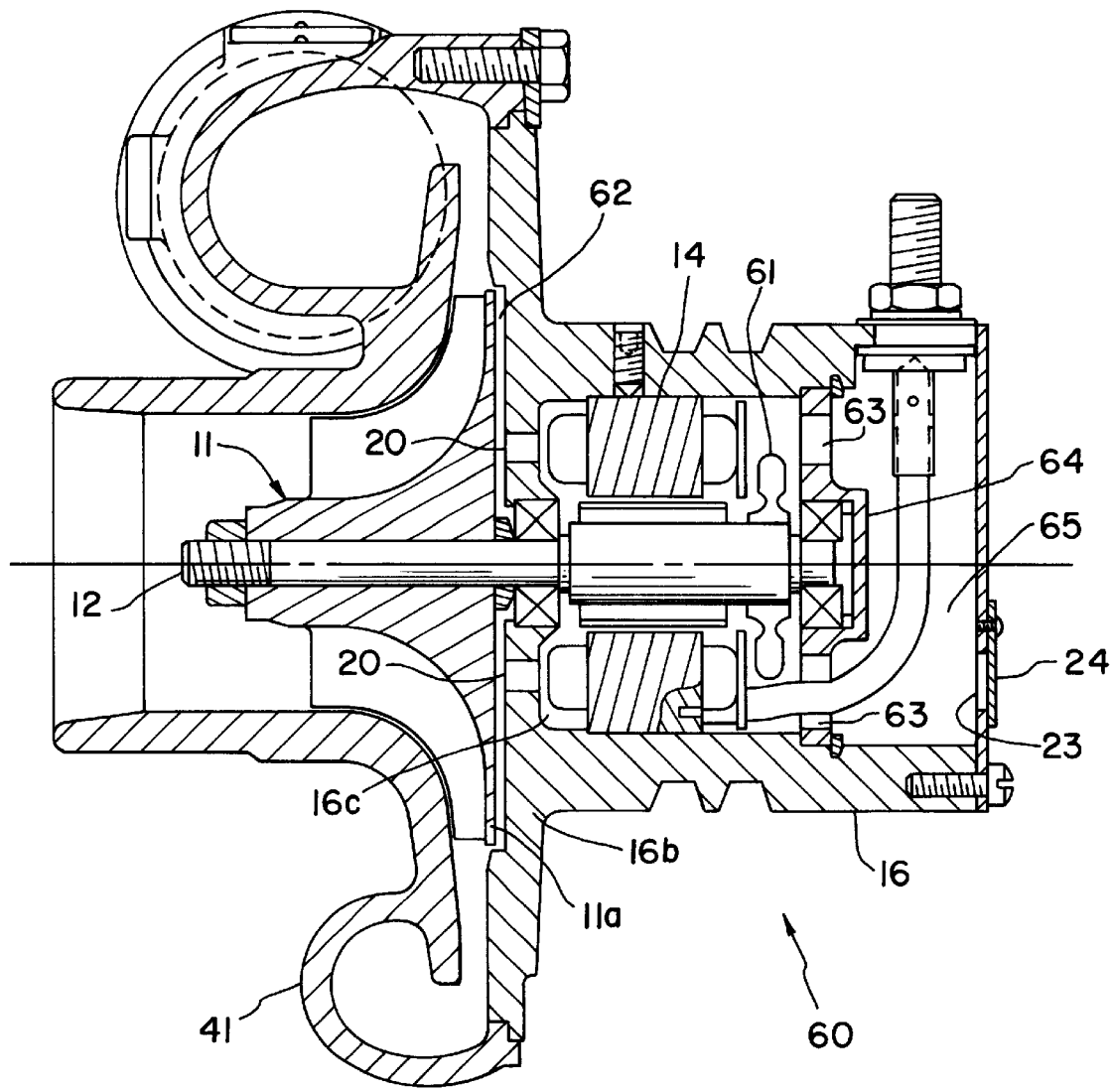
FIG. 6 is a cross-sectional view of still another motor-driven centrifugal compressor of the invention, taken through its central axis, showing a small fan included in the means for providing a flow of cooling air to the motor housing portion.

FIG. 6 illustrates a further embodiment 60 of the invention. Although it is not preferred, a small fan 61 can be mounted on the rotating shaft 12 within the motor housing 16 and rotated at high speed with the rotor. Such a fan 61 can assist in urging a flow of cooling air from the pressurized compressor housing portion through the space 62 between the back wall 11a of the compressor wheel 11 and the front wall 16b of the motor housing 16 and through holes 20 into the motor housing interior 16c. The induced cooling air flows through the motor windings 14 and through holes 63 in bearing support member 64 into end cavity 65 and is exhausted through check valve controlled opening 23, 24.

While we have illustrated and described several embodiments of the invention that we believe comprise the best mode of the invention currently known, those skilled in the art will recognize that the invention can be incorporated into other embodiments and should be defined only by the claims that follow.

We claim:

1. A motor-driven compressor, comprising:
   an electric motor having a stator and a rotor and a rotating shaft driven thereby;
   a centrifugal compressor wheel driven by said rotating shaft;
   a housing having a first portion enclosing the electric motor and carrying a bearing system for the motor-driven rotating shaft, and a second portion forming a pressurized enclosure for the centrifugal compressor wheel; and
   intercepting means comprising an interior surface protruding into the flow of compressed air at the periphery of the centrifugal compressor wheel for providing a flow of cooling air from the pressurized compressor housing portion through the motor-enclosing housing portion and around the motor stator and rotor.

2. The motor-driven compressor of the claim 1 wherein said interior surface comprises an annular lip extending into the flow of compressed air around substantially the entire periphery of the centrifugal compressor wheel.

3. The motor-driven compressor of claim 1 wherein said interior surface adjustably protrudes into the flow of compressed air at the periphery of the centrifugal compressor wheel.

4. A motor-driven compressor, comprising:
   an electric motor and a rotating shaft driven thereby;
   a centrifugal compressor wheel driven by said rotating shaft;
   a housing having a first portion enclosing the electric motor and carrying a bearing system for the motor-driven rotating shaft, and a second portion forming a pressurized enclosure for the centrifugal compressor wheel; and
   an air flow pathway comprising a pipe from the periphery of the pressurized enclosure to the motor-enclosing housing portion for providing a flow of cooling air from the pressurized enclosure to the motor-enclosing housing portion.

5. A motor-driven compressor, comprising
   an electric motor and a rotating shaft driven thereby;
   a centrifugal compressor wheel driven by said rotating shaft;
   a housing having a first portion enclosing the electric motor and carrying a bearing system for the motor-driven rotating shaft, and a second portion forming compressor wheel air inlet and a pressurized enclosure for the centrifugal compressor wheel;
   means for providing a flow of cooling air from the pressurized compressor housing portion to the motor-enclosing housing portion; and
   a conduit means for connecting the interior of the motor-enclosing housing portion with the compressor wheel air inlet.

6. A motor-driven compressor, comprising:
   an electric motor and a rotating shaft driven thereby;
   a centrifugal compressor wheel driven by said rotating shaft;
   a housing having a first portion enclosing the electric motor and carrying a bearing system for the motor-driven rotating shaft, and a second portion forming compressor wheel air inlet and a pressurized enclosure for the centrifugal compressor wheel; and
   means for providing a flow of cooling air from the pressurized compressor housing portion to the motor-enclosing housing portion, wherein the motor-enclosing housing portion substantially encloses the electric motor and includes an exhaust outlet for the flow of cooling air and a non return valve for said inlet.

7. A motor-driven air compressor, comprising a centrifugal air compressor wheel, an electric motor for driving the centrifugal air compressor wheel, and a rotatable shaft carrying the centrifugal air compressor wheel and an electric motor rotor;
   a motor housing forming a motor enclosure for the electric motor, said motor housing having a cylindrical portion carrying stator windings for said electric motor and a planar wall portion extending radially from the cylindrical portion between the centrifugal compressor wheel and the electric motor, said motor housing carrying a pair of shaft bearings and the rotatable shaft and electric motor rotor;
   a compressor housing forming an enclosure for the compressor wheel, a central air inlet to the compressor wheel and a peripheral compressed air collector; and
   means for providing a flow of cooling air from the compressor enclosure through the cylindrical portion of the motor enclosure carrying the stator windings, wherein the flow of cooling air is supplied through an external conduit leading from the peripheral compressed air collector into the motor housing.

8. A motor-driven air compressor, comprising a centrifugal air compressor wheel, an electric motor for driving the centrifugal air compressor wheel, and a rotatable shaft carrying the centrifugal air compressor wheel and an electric motor rotor;
- a motor housing forming a motor enclosure for the electric motor, said motor housing having a cylindrical portion carrying stator windings for said electric motor and a planar wall portion extending radially from the cylindrical portion between the centrifugal compressor wheel and the electric motor, said motor housing carrying a pair of shaft bearings and the rotatable shaft and electric motor rotor;
- a compressor housing forming an enclosure for the compressor wheel, a central air inlet to the compressor wheel and a peripheral compressed air collector; and
- means for providing a flow of cooling air from the compressor enclosure through the cylindrical portion of the motor enclosure carrying the stator windings, wherein the flow of cooling air is exhausted from the motor enclosure through a non-return valve carried by the motor housing.

9. A motor-driven air compressor, comprising a centrifugal air compressor wheel, an electric motor for driving the centrifugal air compressor wheel, and a rotatable shaft carrying the centrifugal air compressor wheel and an electric motor rotor;
- a motor housing forming a motor enclosure for the electric motor, said motor housing having a cylindrical portion carrying stator windings for said electric motor and a planar wall portion extending radially from the cylindrical portion between the centrifugal compressor wheel and the electric motor, said motor housing carrying a pair of shaft bearings and a rotatable shaft and electric motor rotor;
- a compressor housing forming an enclosure for the compressor wheel, a central air inlet to the compressor wheel and a peripheral compressed air collector; and
- means for providing a flow of cooling air from the compressor enclosure through the cylindrical portion of the motor enclosure carrying the stator windings, wherein the flow of cooling air is recirculated from the motor housing to the air inlet of the compressor housing through an external conduit.

10. In a supercharging system for an internal combustion engine, the improvement comprising a motor-driven air compressor for providing a flow of compressed charge air for the internal combustion engine, said motor-driven compressor comprising a temperature sensitive electric motor, including a motor rotor and stator windings, carried in a first motor enclosing housing portion and a charge air compressor wheel enclosed by a second housing portion including a pressurized portion, and integral means comprising an external conduit from the periphery of the pressurized compressor housing to the motor-enclosing portion for directing a flow of compressed air from the pressurized compressor housing portion through the motor-enclosing housing portion and around the motor rotor and stator windings for cooling the temperature sensitive motor.

11. The supercharging system of claim 10 further comprising a conduit means for connecting the interior of motor-enclosing housing portion with the compressor wheel air inlet.

12. The supercharging system of claim 10 wherein the motor-enclosing housing portion substantially encloses the electric motor and includes an exhaust outlet for the flow of cooling air and a check valve for said outlet.

13. The supercharging system of claim 10 further comprising a small fan within said motor-enclosing housing portion driven by said temperature sensitive electric motor for further urging the flow of compressed air through said passageway.

14. A motor-driven compressor, comprising a centrifugal compressor wheel, an electric motor for driving the compressor wheel and a rotatable shaft carrying the centrifugal compressor wheel and electric motor rotor;
- a motor housing forming a motor enclosure for the electric motor, said motor housing having a cylindrical portion carrying stator windings for said electric motor and a planar wall portion extending radially from the cylindrical portion between the centrifugal compressor wheel and the electric motor, said motor housing carrying a pair of shaft bearings and the rotatable shaft and the electric motor rotor;
- a compressor housing forming an enclosure for the compressor wheel, a central air inlet to the compressor wheel and a peripheral compressed air collector;
- a lip protruding into the flow of compressed air from the compressor in the compressor housing for providing a flow of cooling air for the motor enclosure, and means for delivering the flow of cooling air to the motor-enclosure.

15. The motor-driven compressor of claim 14 wherein the lip is formed on the planar wall portion adjacent the periphery of the centrifugal compressor wheel.

16. The motor-driven compressor of claim 14, wherein the amount of cooling air can be adjusted by the amount of protrusion of the lip into the flow of compressed air at the compressor wheel periphery.

17. The motor-driven compressor of claim 14 wherein the flow of cooling air for the motor components is supplied through a pathway formed in radially extending planar wall portion of the motor housing, leading from the compressor enclosure in to the motor housing.

18. The motor-driven compressor of claim 17 wherein the pathway comprises at least one passageway formed in the radially extending wall portion between the peripheral compressed air collector and the motor enclosure.

19. In a supercharging system for an internal combustion engine, the improvement comprising a motor-driven compressor for providing a flow of compressed charge air for the internal combustion engine, said motor-driven compressor comprising a temperature sensitive electric motor carried in a first motor-enclosing housing portion and a compressor wheel enclosed by a second housing portion including a pressurized portion, and integral means comprising an air scoop in said pressurized compressor housing portion for intercepting the flow of compressed air in the pressurized compressor housing portion, and means for directing the flow of compressed air into the motor-enclosing housing portion.

20. The supercharging system of claim 19 wherein said air scoop comprises an annular lip extending into the flow of compressed air around substantially the entire periphery of the centrifugal compressed wheel.

21. The supercharging system of claim 19 wherein said air scoop can adjustably protrude into the flow of compressed air at the periphery of the centrifugal compressor wheel.

22. A motor-driven compressor, comprising:

an electric motor having a stator and a rotor and a rotating shaft driven thereby;

a centrifugal compressor wheel carried by said rotating shaft;

a motor housing including an axially extending portion for carrying the electric motor stator and a forward portion extending radially from said axially extending portion and forming at least one projecting boss portion;

a compressed air collector surrounding said centrifugal compressor wheel and being carried by said radially extending portion of the motor housing and forming, with said radially extending portion of the motor housing, a pressurized enclosure;

said at least one boss being provided with a compressed air passageway leading from the pressurized enclosure into the axially extending motor-carrying housing portion for providing a flow of cooling air from the pressurized enclosure for the electric motor.

23. The motor-driven compressor of claim 22 wherein the compressed air passageway is directed at the stator windings carried by the axially extending portion.

24. The motor-driven compressor of claim 22 wherein the motor housing substantially encloses the electric motor and includes an exhaust outlet for the flow of cooling air and a non-return valve for said outlet.

25. The motor-driven compressor of claim 22 wherein said rotating shaft carries a small fan in the motor-enclosing housing portion for further inducing the flow of cooling air through the compressed air passageway.

* * * * *